United States Patent
Deran

(10) Patent No.: US 10,417,209 B1
(45) Date of Patent: Sep. 17, 2019

(54) CONCURRENT INDEX USING COPY ON WRITE

(71) Applicant: Roger Lawrence Deran, Santa Cruz, CA (US)

(72) Inventor: Roger Lawrence Deran, Santa Cruz, CA (US)

( * ) Notice: Subject to any disclaimer, the term of this patent is extended or adjusted under 35 U.S.C. 154(b) by 663 days.

(21) Appl. No.: 13/831,165

(22) Filed: Mar. 14, 2013

(51) Int. Cl.
  *G06F 16/22* (2019.01)
  *G06F 16/23* (2019.01)

(52) U.S. Cl.
  CPC ...... *G06F 16/2246* (2019.01); *G06F 16/2308* (2019.01); *G06F 16/2329* (2019.01); *G06F 16/2336* (2019.01); *G06F 16/2343* (2019.01)

(58) Field of Classification Search
  None
  See application file for complete search history.

(56) References Cited

U.S. PATENT DOCUMENTS

| | | | |
|---|---|---|---|
| 4,742,450 A * | 5/1988 | Duvall et al. | 719/310 |
| 4,823,310 A | 4/1989 | Grand | |
| 4,914,569 A * | 4/1990 | Levine et al. | |
| 5,010,478 A * | 4/1991 | Deran | G06F 16/40 |
| 5,261,088 A | 11/1993 | Baird | |
| 5,283,894 A * | 2/1994 | Deran | G06F 16/40 |
| | | | 707/704 |
| 5,430,869 A | 7/1995 | Ishak | |
| 5,475,837 A | 12/1995 | Ragaa | |
| 5,495,609 A * | 2/1996 | Scott | 707/696 |
| 5,758,356 A | 5/1998 | Hara | |
| 5,764,877 A * | 6/1998 | Lomet | G06F 11/1451 |
| | | | 707/999.003 |
| 5,806,065 A * | 9/1998 | Lomet | G06F 17/30327 |
| | | | 707/610 |
| 6,282,605 B1 * | 8/2001 | Moore | G06F 3/0614 |
| | | | 707/999.003 |
| 6,480,839 B1 * | 11/2002 | Whittington et al. | |
| 6,480,849 B1 | 11/2002 | Lee | |
| 6,792,432 B1 | 9/2004 | Kodavalla | |
| 7,293,028 B2 | 11/2007 | Cha | |
| 9,003,162 B2 * | 4/2015 | Lomet | G06F 12/10 |
| | | | 707/999.2 |
| 2006/0036627 A1 * | 2/2006 | Deran | G06F 16/2246 |
| 2010/0235335 A1 * | 9/2010 | Heman | G06F 16/23 |
| | | | 707/703 |
| 2011/0246503 A1 * | 10/2011 | Bender | G06F 17/30306 |
| | | | 707/769 |
| 2011/0296299 A1 * | 12/2011 | Parker | 715/255 |
| 2011/0296300 A1 * | 12/2011 | Parker | 715/256 |
| 2013/0346725 A1 * | 12/2013 | Lomet | G06F 12/10 |
| | | | 711/206 |

* cited by examiner

*Primary Examiner* — Ashish Thomas
*Assistant Examiner* — Mellissa M. Ohba

(57) ABSTRACT

A hierarchical data storage and retrieval index uses copy-on-write of a block ancestor path to allow concurrent multi-version read access and single writers, while providing a garbage collector that allows quick recycling of the copied blocks. A further layered tree index uses a copy-on-write concurrent multi-version meta tree above a layer of lock-protected blocks to provide multi-reader multi-writer access. Both indexes are efficient with multiple cores.

19 Claims, 2 Drawing Sheets

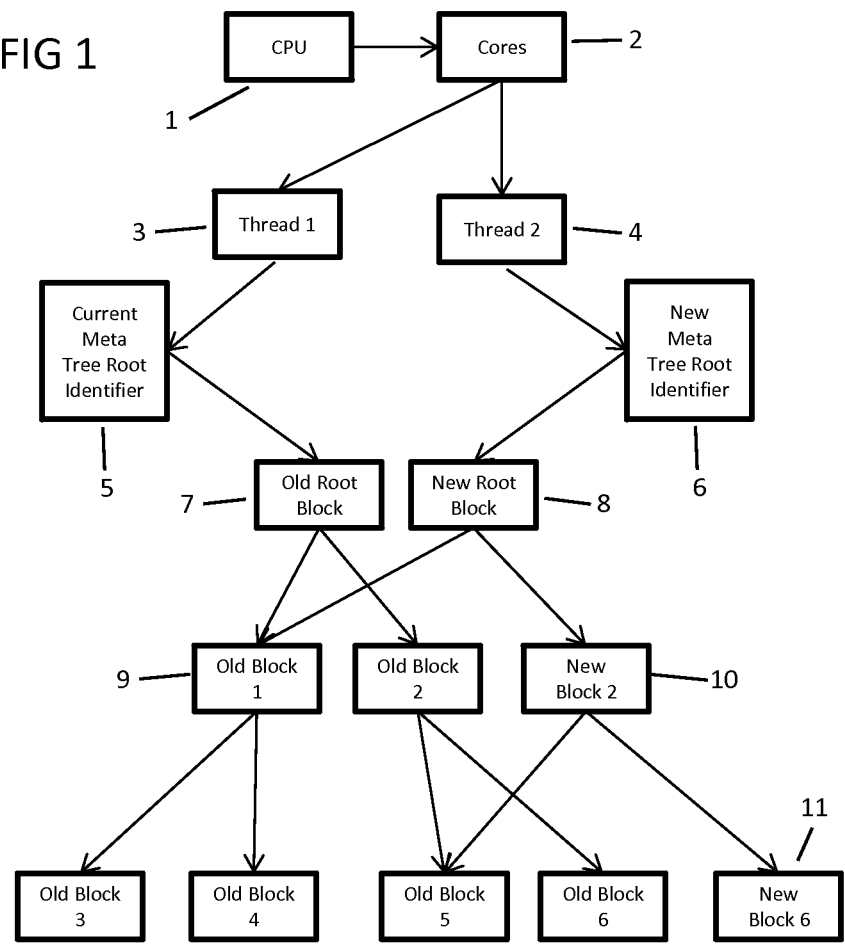

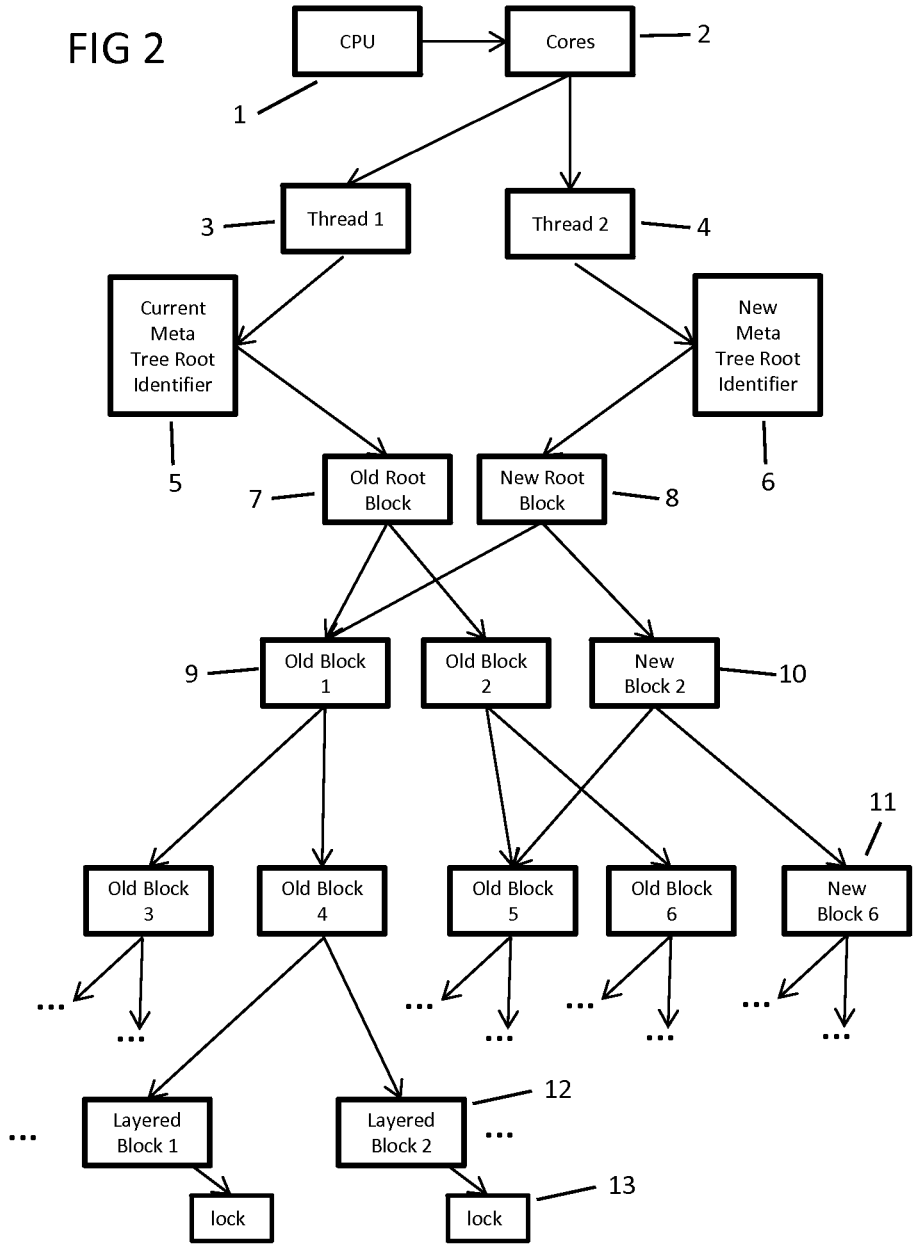

CONCURRENT INDEX USING COPY ON WRITE

A portion of the disclosure of this patent document is a computer program listing which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This index system relates to a performance improvement via increased concurrency of access for a computerized search index. The performance improvement is most evident in a multi-core computer but is also to be seen when threads execute the index accesses on a single core. The index allows the reading of a data value identified by a key, as well as the alteration of the content of the index. A typical such index allows the insertion of a data value given a key that is not in the index. Another typical such index can allow the deletion of a data value identified by a key in the index. Yet another such improved index may allow modification of the data value in the index without affecting the associated key. The index has a tree structure comprising a set of blocks, with a root block, intermediate branch blocks if necessary, and leaf blocks, each block having a key magnitude range, each key range on the path from root towards leaf blocks becoming increasingly narrow. This is the case with the ubiquitous B-Tree index. Examples of variable-sized block implementations exist, but often a block corresponds to a fixed-size region of disk or memory, or a collection of references to child blocks or other objects.

Performance of the present index is increased through the capability of multiple threads concurrently to traverse and modify the tree without locks on the root or other non-leaf blocks. Leaf blocks may be accessed either with or without locks depending on the usage environment and purpose of the leaf blocks or even whether the leaf blocks are structured as part of an index at all: in the latter case, the leaf blocks may be any kind of object, and one of ordinary skill in the art will recognize that the leaf blocks can take any form. The index uses a copy-on-write mechanism on the root and non-leaf blocks, while the leaf blocks are not necessarily copied. The root and non-leaf blocks are referred to herein as the 'MetaTree blocks', while the blocks in the lowest layer are referred to as 'Leaf blocks'.

This improvement relates to any computerized search index, for example, a data access method in a database management system, such as but without limitation, a B-Tree index. Such an index for example can be used for text searches, relational DBMS table search, searches in an object-oriented database, searches in an Entity-Relation database, searches in an Entity-Attribute database, searches in an Entity-Attribute-Value database, and special-purpose searches such as, without limit, a geographic search, or a molecular or DNA search. An entire database structure, such as a relational database or other database of any sort can be stored inside an index with suitable key formatting, as in prior art. This index system is not limited by the interpretation of the index contents, and this index system is not limited by necessarily being a component in an enclosing database management system.

The index may exist in primary or secondary storage or in a combination of primary and secondary storage, such as in a structure as described in U.S. Pat. Nos. 5,283,894 and 5,010,478. The MetaTree described herein corresponds to the meta access method therein, and the Leaf blocks herein correspond to the basic tree locks therein. The basic blocks are the ones in the patents that are stored in secondary storage or as copies in primary storage, and the copies are also kept in primary storage in a structure known as the cache, while the meta access method is in primary storage, although not necessarily in the same primary storage or in the cache with the basic tree blocks. In the patents the meta access method can be any kind of structure, not necessarily a tree. The index described in the patents can benefit from the present index structure because the present index can function as a fast meta access method allowing fast searches to the blocks of the basic tree, said basic tree blocks happening to be in the cache at the time of access. The present index is not limited to use as such s meta access method however, corresponding to the referenced patents.

2. Description of the Prior Art

Prior-art search indexes that use a block structure sometimes keep data in each block as an array of bytes or as an array of other fixed-size data units, where the array is usually of a fixed size, and they organize the fixed-size units into keys and values. The fixed-size data units are usually bytes, although prior art implementations have used two-byte wide Unicode data units for example, but the size of the fixed-size units is not essential. When this specification describes structures in terms of bytes, it should be clear to one of ordinary skill in the art that any fixed-size units can be used instead. Prior-art indexes have accommodated keys as fixed numbers of bytes within a given block and prior-art indexes have accommodated the values as fixed numbers of bytes within a given block, and prior-art indexes have also accommodated variable-size keys and prior-art indexes have also accommodated variable-size values by using a different number of bytes for a plurality of the keys or values.

Other prior-art indexes have used blocks or nodes that are in primary memory and which contain, instead of bytes, references or pointers to child blocks or other Objects, mixed together with keys. The keys may be objects also, and need to be comparable with each other in order to be able to narrow down the range of the keys in the children. An example is the java.util.TreeMap, which uses a red-black tree instead of a B-Tree.

Prior-art indexes which exist in a concurrent-access environment provide a lock on a block in order to prevent the concurrent reading and writing of a block and to prevent the concurrent writing of a block by different threads. Writes of the data in the block by a given thread, such as inserts or deletes of keys with their associated values, or modifications of values or other data in the block, make the block or part of the block temporarily unusable to other threads. When the index must be expanded or contracted such as by splitting a block or by merging blocks at any level, a write lock on a parent block or on a range of keys contained in a parent block is needed. The requirement for a parent-block locking step during a child block split operation complicates access because there is also a child-block-locking step during the downwards traversal of the index for searching. Thus the locking for read goes downwards while the locking for splits goes upwards, and deadlocks and other problems ensue. There are various solutions to the bidirectional locking problem but they all still involve locks, slowing access considerably in a multi-core environment.

A per-block lock or key range lock applies to the root block as well, and this often means there is a single per-tree lock that all threads must temporarily hold, causing a serialization.

Some indexes chain leaf blocks in series when collisions occur and the locking becomes difficult, but such a chain causes an index gradually to 'age' and to require occasional rebuilding in order to avoid gradual performance degradation from long chains.

Prior-art indexes often omit a block merging operation due to locking complications.

The problems with locking the root block or any other block are exacerbated when multiple CPU cores are available.

Multi-core computers are becoming common, and the number of cores in each generation of computers is multiplying at Moore's-law speed, i.e. doubling each 18 months. Each such core is capable of executing one thread at a time concurrently with respect to all other cores, hence in modern programming, multi-threading and multi-core techniques are increasingly important. These techniques are developing slowly and are difficult to master, so often single-threaded programming is used and all but one core remain idle. Multi-processor shared-memory systems, which are the logical equivalent of multi-core systems, have actually existed for some time, but they have been expensive compared to the almost ubiquitous multi-core chips arriving now. Multi-processor shared-memory technology and multi-core technology are not mutually-exclusive, so there are hybrids, and all such systems can benefit from the present index. From here on when we say 'multi-core' we include multi-processors or hybrids.

Furthermore, any kind of locking on blocks makes the assumption that locks are cheap, which is not necessarily true in the case of concurrent access by multiple threads in a multi-core environment. In a multi-core environment, it is cheap to acquire a lock as long as no other thread is holding the lock, but if a wait is required, performance becomes poor because the wait queue for a lock is a data structure that requires considerable maintenance. In fact, instead of increasing, overall performance can actually degrade dramatically as the thread count increases and there is more and more contention for a particular lock. Such contention produces inefficient 'convoys' of threads in wait queues.

Instead of locks with wait queues, some multi-core systems use spin locks, but spin locks are inefficient when there is contention, because while there is contention they cause busy waiting during which time one or more cores simply loop and perform no useful work. Nevertheless, spin locks are often used for implementing data structures such as atomic variables and lockless lists or lockless hash maps that are used in multi-core or multi-processor environments and that each inherently limit contention in some way to minimize spinning. These lockless data structures can use compare-and-swap primitives or instructions for example to do short loops while modifying data structures to be so-called lock-free, or else they can even avoid the looping altogether and be so-called wait-free by using only memory barriers, compare-and-swap primitives, and atomic and volatile variables, often coupled with garbage collection in intricate ways. Such data structures are so intricate that successful implementations are published and often included in language libraries, such as the java.concurrent class library, so that programmers do not need to re-invent them. In the present index system, most searches follow a fast path through the index that has no locks, hence it is lock-free, although occasionally the searches are flushed by intentionally delaying them, and the searches must wait on locks.

BRIEF SUMMARY

Accordingly, it is a goal of the index system to provide good multi-core or multi-CPU performance for reads and writes of a block-structured search index. While such hardware concurrency is one goal of the index system, the reduction of lock contention has beneficial effects even in single-core multi-threaded access because lock contention is reduced and the attendant queue data structures are not expensive to maintain.

The Meta Tree

In this index system there is a meta tree containing a single root block and possibly some intermediate branch blocks, and then a set of bottom-most branch blocks, while the bottom-most branch blocks are not restricted from being the root block if the tree is small. The meta tree may be a BTree. The meta tree achieves multi-reader single-writer concurrency because of its copy-on-write feature and it is effectively lock-free for isolated searches, and interrupted lock-free when mixed searches and writes are going on. There is a global lock, thereby making the system in principle non-lock-free but there is a technique for avoiding it needing to be acquired in most situations, and when it is requested, it is designed to be mostly uncontended. The global lock serializes writes.

The Garbage Collector

The meta tree writes create considerable garbage in the form of copied blocks. There is an optional garbage collector feature of the meta tree that recycles the blocks quickly. The garbage collector reduces the concurrency somewhat by introducing delays of searches on current writes. If the garbage collector is omitted, the meta tree is lock-free for searches and serialized for writes, and searches can overlap writes. A native garbage collector instead, such as the Java collector, can be used to preserve the lock-free search characteristic instead, but it may be slower.

The Layered Meta Tree

In one embodiment, the meta tree is treated as a top layer in a two-layer index which achieves almost complete multi-reader and multi-writer concurrency. The internal structure of the top meta tree layer is actually unimportant in this embodiment, as long as it can identify leaf blocks in the bottom layer in a way that allows fast concurrent searching. In this embodiment the name meta tree should be clear, as it sits on top of the leaf layer. The leaf layer is comprised of a set of blocks or containers or any other data that is to be accessed by a range of keys. One typical characteristic of the leaf layer is that it sometimes needs to be modified in such a way that its leaf blocks split, requiring inserting a new split key into the meta tree above it to divide the two new children. A layered meta tree contains exclusive or read-write locks on the leaves to control access, but the searching to the leaves is concurrent via the meta tree.

BRIEF DESCRIPTION OF THE DRAWINGS

FIG. 1
1. The CPU is a Central Processing Unit, containing one or more cores. Examples of a CPU are: one or more integrated circuit chips on one or more printed circuit boards in one or more physical containers;
2. The one or more core, capable of executing instructions;

3. Thread one, a thread of execution whose instructions are carried out by one of the one or more cores;
4. Thread two, a thread of execution whose instructions are carried out by one of the one or more cores;
5. Current meta tree root identifier, a datum that allows the old root block to be located and which is accessible by thread one;
6. New Meta Tree Root Identifier, a datum that allows the new root block to be located and which is accessible by thread two;
7. Old Root Block is a Meta Tree block that is identified by the current meta tree root identifier;
8. New Root Block is a Meta Tree block that is identified by the new meta tree root identifier;
9. Old Blocks 1 to 6 are meta tree blocks that form a tree descending from the old root block;
10. New block 2 replaces old block 2 in the new meta tree descending from the new root block;
11. New block 6 replaces old block 6 in the new meta tree descending from the new root block.

FIG. 2
1. The CPU is a Central Processing Unit, containing one or more cores. Examples of a CPU are: one or more integrated circuit chips on one or more printed circuit boards in one or more physical containers;
2. The one or more core, capable of executing instructions;
3. Thread one, a thread of execution whose instructions are carried out by one of the one or more cores;
4. Thread two, a thread of execution whose instructions are carried out by one of the one or more cores;
5. Current meta tree root identifier, a datum that allows the old root block to be located and which is accessible by thread one;
6. New Meta Tree Root Identifier, a datum that allows the new root block to be located and which is accessible by thread two;
7. Old Root Block is a Meta Tree block that is identified by the current meta tree root identifier;
8. New Root Block is a Meta Tree block that is identified by the new meta tree root identifier;
9. Old Blocks 1 to 6 are meta tree blocks that form a tree descending from the old root block;
10. New block 2 replaces old block 2 in the new meta tree descending from the new root block;
11. New block 6 replaces old block 6 in the new meta tree descending from the new root block;
12. A Layered Tree block descending from the meta tree;
13. A block lock attached to layered tree block 12.

DETAILED DESCRIPTION

Copy-On-Write

The index system uses a copy-on-write technique for the branch path to a particular bottom-most branch block corresponding to the given search key. The copying of the branch path occurs when a leaf block is split as a result of the insertion of a key into it or when a merged leaf block is merged with a neighbor leaf block as the result of a deletion from it. A prior-art index will normally lock the parent of the split leaf or split non-leaf block in order to insert a new key into the parent block or to delete a key from the parent block, but the present index system instead makes a copy of all of the blocks in the branch path, linking them together in such a way as to create a new meta tree including the new key or omitting the deleted key, finally substituting the top-most new meta tree path block as a new root, which will be used for further searches. The entire meta tree is not copied, only the blocks on the branch path, so only one reference value in each block in the branch path needs to be changed such that it identifies the copied child of each block.

The fact that a meta tree is serialized on writes is compatible with a situation in which the leaves split or merge less frequently than they are inserted into or otherwise modified. The layered meta tree is not limited in its write speed because the leaf blocks can be concurrently written. So a layered meta tree is multiple-reader and multiple-writer concurrent to the extent that different leaf blocks are used, and it always benefits from the usually lock-free access via the meta tree.

The substitution of the new root block for the old is atomic, so searchers always start with the new root block or the old root block according as the substitution has occurred or not, but the searchers never find a partially substituted root block identifier, which would lead to chaos. For example, if the root block identifier takes more than one byte in memory, it may be possible for cores to intermingle memory accesses with each other as they execute concurrently, with one core seeing a byte from one identifier combined with a byte from another identifier. In order to make the substitution atomic, a reference or pointer or index or other identifier indicating which block is the root is changed atomically, and this reference can be ensured to be atomic by various means. For example, a Java or C Sharp or Visual Basic Object reference is atomic by itself, as are references in other environments, which means that an assignment of an Object to a referencing variable occurs completely or not at all. However, a C or C plus plus pointer or an integer block number are not guaranteed to be alterable atomically, and therefore such block identifiers must be made atomic by being protected by appropriate means, such as by a suitable spin-type lock or a compare-and-swap loop, or a known characteristic of the hardware that guarantees atomicity of certain writes. A further requirement of the root identifier is that it be volatile, i.e. that changes to it are visible to the other threads whenever it changes. This can be provided by a memory bus lock instruction or instruction prefix or memory barrier instruction. In Java, Visual Basic, and C sharp, a variable can be declared volatile, and all of the considerations about the method of obtaining multi-thread visibility are handled by the language's runtime. In C, and C plus plus, for example when using the pthreads library the atomicity is more difficult but can be obtained with suitable mutexes and condition variables if necessary, or preferably memory barriers if available, plus the root variable will be declared volatile. Other variables in this index system are declared volatile as well. The particular means for making the root identifier substitution atomic and volatile is not material to this index system, and one skilled in the art can devise suitable means.

The copy-on-write would be relatively expensive except for the fact that splits of leaf blocks occur much more rarely than inserts into the leaf blocks, assuming that a relatively large number of keys normally exist in the leaf blocks. The reason is that each block contains a variable amount of free space that can absorb a series of insertions before the block must split. The free space normally varies from one-half of the block size down to nothing, but under some circumstances it can be less, such as, in some index implementations in general, when the block is the last one referred to by its parent. The same is true of merges, in that the merging of leaf blocks only occurs after a relatively large number of deletions in a pair of adjacent leaf blocks. Merges only need occur when the combined data in adjacent blocks on the same level fits in one block with a reasonable amount of free space left in the merged block. Merging is not necessary for this index system to be advantageous however. The index system is advantageous for any kind of leaf write, be it deletion, insertion, update, or any other kind of change to the content of the leaf block or any mixture of such changes. It is common that a set of random changes to a leaf block such as updates will change its fullness only slightly, so that it splits or merges rarely, and a change to the meta tree is therefore also rare.

Multi-Versioning

The current root block is used as the starting point for any new search, whether the search is for read or for write of a leaf block. Once a branch path copying is done by the current writer thread, the current root block is replaced by a new copied root block by changing the current root block identifier variable, and further searches start with the new copied root block. This means that there may be searchers that are still searching on copied branch paths, and which are searching branch blocks that have been copied. Effectively, each time the current root block changes, a snapshot of the meta tree is taken and existing searchers can continue using the various snapshots. Hence a multi-version situation arises, because each time a branch path is copied and a new root is created, the searchers on the branch path that was copied may still be traversing their particular views of the meta tree downwards, possibly still searching inside a copied root block or at any depth below it in a copied block down to a leaf block. Because there are not necessarily a small number of client threads in the system, there can be a large number of actively used copied blocks at any one time. Copied blocks that become unnecessary for searching may need to be reclaimed by a reclamation means in order to allow continued usage of the index over time without accumulating too much memory space for copied but no-longer used blocks.

Native Garbage Collection not Always Sufficient

Even in computing environments where native garbage collection is provided, such as the Java, C sharp, or Visual Basic environments, it may be relatively slower to contend with the steady stream of relatively large blocks of memory being produced by multiple cores working as fast as possible to write into the meta tree. An example is a block size of 4096 bytes, with an example tree depth of 5, so 4096 times 5 bytes in total needs to be copied and garbage collected for each meta tree write. If the native garbage collection is fast enough, it can still be used with a meta tree and layered meta tree, simplifying the implementation but retaining the performance advantage of the multi-versioning, and still providing the advantages of the layered meta tree described herein.

Native garbage collection works by finding and reclaiming unreachable objects, where object reachability is determined by the pattern of references to and between objects. The concept of logical reachability applies to blocks in the index described by this index system. A copied block qualifies as logically reachable if it is a direct or indirect child of either the current root block or of a block being searched.

Situations without Native Garbage Collection

There can be other reasons beyond performance to avoid the native garbage collection. For example, there is simply no garbage collector in the C and C plus plus or machine-language environments. Or, the blocks may be comprised of bytes that need to be combined into an integer that indexes into an array of block headers, so the association between block identifier and the block itself is not visible to the garbage collector. Sometimes it may be possible to embed pointers into the data bytes for fast traversal, but still no native garbage collector would see them. Also, there may be other structures that reference the copied blocks. For example, a hash table that translates block ids into references would need to have stale references flushed by the garbage collector of the present index.

Conservative Garbage Collectors Too Slow

Some environments provide a form of garbage collection known as 'conservative' and which can be used in languages such as C or C plus plus to reclaim some allocated memory areas based on the non-existence of possible pointers to candidate allocated memory areas. Not all unreachable memory is necessarily freed by these garbage collectors, so it is always possible that a running program will run out of memory unnecessarily. In these environments, the data values in the blocks that identify child blocks can be simple pointers to the child blocks, and the blocks may be possible to be freed by the conservative garbage collectors, but these garbage collectors require scans of large areas of memory and are not fast enough to be usable for memory management for a multi-core system.

The Block Pool of the Garbage Collector

This index system optionally includes a block pool containing unused blocks ready to be used again for another write of the branch blocks on a branch path as described above. The block pool is not necessary if a small number of writes are anticipated, or else in certain conditions if there is a native garbage collector and it is fast enough. The pool may be small, such as a few blocks, or big and it is an in-memory set of zero or more currently unused blocks. The same pool may be used for managing leaf blocks, especially if the sizes of the meta tree blocks is the same as the size of the leaf blocks. An obvious choice for the block pool of the index system uses a traditional allocation scheme such as the C language or C plus plus language heap memory. The C language heap can be used statically or dynamically, in which statically means that the blocks are kept in the allocated state for very quick reuse, and dynamically means blocks are allocated from the heap as needed via the malloc function or the new operator or the like, and then returned it when reclaimed via the free function or the delete operator or the like, with the dynamic technique expected to be the slower. Another choice uses a collection of objects in an object-oriented environment which are arrays of bytes, one or more arrays per block with possible associated block header objects, such as in the Java or C sharp or Visual Basic environments. Yet another choice is to keep sets of blocks containing collections of references or pointers rather than or in addition to byte arrays, as would be typical in an object-orient system. The sample source code included with the present system uses such as set of collections in each block in the form of an array of objects, each object containing a reference to a key and a reference to a value.

The Global Lock

In this index system, a global exclusive lock serializes the writes to the meta tree. The lock does not appreciably slow down most client threads of the meta tree, since most client threads are searchers of the meta tree as explained above, and meta tree searchers usually avoid having to acquire the lock because of a special mechanism. Searchers of the meta tree include readers as well as writers of the leaf blocks. Searchers can avoid acquiring the lock if an atomic volatile flush flag boolean variable is false. The lock is only infrequently subject to contention and therefore wait queues do not need to be maintained in most situations, and the lock request takes very little time to satisfy. In fact, many prior-art lock mechanisms have special code paths for uncontended lock requests that require only a few instructions. The global lock is not only used by this index system for its basic function, but it can also be advantageously used without limitation by the client threads for various relatively rare housekeeping operations that require simultaneously blocking the entire set of accessing threads, such as for shutting down the index.

The Obsolete Block Sets A and B.

In order to be able to reclaim unused blocks, it is necessary to keep track of the blocks that are being actively used in the multi-versioning scheme. A pair of obsolete block set data structures that record the set of copied blocks is used. Each can be an array or linked list or vector or set or map or hash or other relatively efficient modifiable in-memory container of references or pointers to blocks or any other kind of identifiers of blocks. There are two similar such sets, A and B. They are used in a pipeline by having the identifiers of the copied blocks initially added to A, then logically moving them to B at the appropriate time, and finally by moving the identifiers in B back to the free block pool, according to the rules described below. A block identifier can be a pointer, reference, array index, byte offset, or other datum that allows a block to be determined.

The Atomic Flush Boolean Flag Variable

An atomic volatile flush boolean flag variable is set to true by the current writer on entrance to the write, serving as an indication that the apply obsolete block set operation described below is enabled to be triggered according to the rules described below. The flush Boolean is declared to be volatile or atomic so that all threads accessing it will see changes of other threads. The apply operation must be performed while the global lock is held.

Searcher threads use the flush flag to avoid having to lock the global lock. The flush flag is tested before the lock is requested, and if true, then the global lock is acquired, and in case the flag happened to be set false by a different thread during the interval between its testing and the granting of the lock, it is retested, and if false, the lock is released and the thread continues as if the flush flag had not been discovered to be true. Searchers do not wait on the global lock during the entire time they do the searching but instead only wait on it during the time the apply obsolete block set operation described below is being performed.

The Read Depth Variable

An atomic volatile read depth integer variable is maintained by the searchers as they enter and exit, starting at zero initially. It is atomic so that it can be shared by threads. Each entry to a search increments the variable and each exit decrements it. The increment and decrement always occur, regardless of the state of the flush flag.

Incrementing and decrementing an atomic integer such as the read depth is fast because it requires only a fast spin lock to protect it, and usually the spin lock will not spin. A spin lock spins by looping internally if necessary until it acquires the lock, thereby causing the requesting thread to wait and causing a core to temporarily stop doing any useful work for a short time if necessary. A spin lock has no wait queues to maintain, so it is very effective at protecting resources that need to be protected for only a short length of time. The actual time spent spinning is low. Atomic variables are lock-free. Most multi-threading environments currently provide atomic variables.

The Write in Progress Boolean Variable

The write in progress volatile boolean variable is set true at the beginning of a write operation and set false at the finish of the operation. This variable serves as a means for serializing write access to the meta tree, but there could be other means for achieving serialization that do not require such a variable. One skilled in the art would readily see how to eliminate this variable. The variable is examined by other parts of the index system, but in these locations, the effective value of the variable could be inferred from the state of a lock or by other means without an actual variable.

The Apply Obsolete Block Set Operation

Before it replaces the current search root with the new root, the writer places all of the identifiers of the blocks it has copied during the write operation into obsolete block set A. Blocks in set A are not necessarily unreachable. The apply obsolete block set operation is triggered in several cases:

1) after acquisition of the global lock after entrance to the meta tree write operation, or
2) before the release of the global lock before exit from the meta tree write operation, or
3) when a searcher thread begins its search and a write is not in progress as indicated by the write in progress flag, or
4) when a searcher thread finishes its search and a write is not in progress as indicated by the write in progress flag.

The apply obsolete block set operation in any case finishes immediately, doing nothing, if the read depth is not zero or if the flush flag is false. Otherwise, the operation moves some or all of the identifiers of blocks in set B to the free block pool, then logically moves some or all of the set of block identifiers in set A to set B, and finally sets the flush flag false.

At the entrance of the meta tree write operation, the writer thread waits until the write in progress flag is false, indicating that it may proceed safely with its writing, and then the writer thread sets the write in progress flag true, then it performs the write, and then it sets the write in progress flag false on exit. Another kind of wait occurs before a searcher exit from a meta tree search. The searcher will wait as long as the flush flag is true and the read depth is greater than zero. The searcher wait ensures that the copied blocks are eventually flushed of searchers and can be reclaimed. The waits can be achieved in a variety of ways, one being via standard condition variables as in the pthreads environment, or via the Java synchronization primitives, both having wait( ) signal( ) and broadcast( ) operations. These waits are never for indeterminate periods of time but always complete, causing at least one thread always to be released and progress always to be made, hence they are lock-free.

It will be obvious to one skilled in the art that the A and B sets can be implemented in a wide variety of ways, such as by using containers of references or pointers or integers or containers of other types. Also, the sets could obviously be implemented using the state of the blocks, such as by having a boolean flag that indicates when the block is in the A set or in the B set, or multiple boolean flags. Also, some other information associated with the block could be state that indicates the set membership. It will also be obvious that the A and B sets could be in the same container, with other information used for distinguishing them. It will also be obvious that a queue or first-in-first-out container could be used for the A and B sets, because of the pipelined pattern of use of the A and B sets. In fact, the use of the letters A and B to designate the two sets comes from the pipelined nature of their use. Obviously an increase in the state membership information, such as by using an integer counter for some subset of the blocks could be used. Also obvious would be to do the logically replacing of the set of block identifiers representing the contents of set B with the contents of set A simply by swapping the containers rather than their contents. Also obvious would be splitting the apply obsolete block set operation into parts executed at different times or in different frequencies, such as accumulating many blocks in set B before moving them to the free block pool.

First Embodiment

In the first embodiment of the index system, the meta tree is searched to find a leaf block, then the leaf block is searched to find a key with a possible associated data value. Thus the data associated with the key in the lowest meta tree block is a reference to a leaf block. Modifications of the leaf blocks may cause splits or merges and require the meta tree to be modified. The effect of this arrangement is to provide an overall tree, if the meta tree and the leaf block layer are considered combined together.

It will be obvious to one skilled in the art that the leaf blocks can be kept in a cache in primary memory. It is obvious that the leaf block references in the lowest blocks of the meta tree can be enhanced to indicate that a particular leaf block is not present or accessible in memory at a particular time. It is obvious that the meta tree blocks can be stored in the cache along with the leaf blocks. It is obvious that leaf blocks can be locked from access by searchers by enhancing the leaf block references, such as by including an extra lock bit. It is obvious that the meta tree could be a set of blocks in primary memory or in secondary storage, i.e. disk, solid-state disk, or RAID array and so on, as is the case in the referenced patents.

Second Embodiment

The second embodiment is like the first embodiment but the leaf block is locked by a lock associated with the leaf block. The leaf block lock is a traditional lock, such as a read/write lock or an exclusive lock or a mutex. The locking of the leaf block is expensive only if there is contention on it, which will be rare for many applications. For example, contention will be rare if the leaf lock is a read-write lock and a) there are mostly reads, b) writers write to relatively disjoint sets of leaf blocks, or c) there are relatively few concurrently writing threads, or a combination of these or other patterns. Also, contention will be low if access is random or scattered and there are relatively many leaf blocks.

It is obvious to one skilled in the art that the lock can be kept in a block header for each block or in some data structure that parallels the blocks.

Third Embodiment

An obvious modification of this index system is to avoid using leaf blocks altogether but instead to have the child block identifiers of the lowest meta tree blocks be any kind of data. This embodiment is useful when the writes are rare or else when the extra time it takes to copy the meta tree block path on writes is acceptable. The block path copying may actually not be significant because altering the lowest meta tree block is not necessarily much faster. For example, the bytes in the lowest meta tree block may need to be copied from place to place in the block to open a space for a newly inserted key and possibly data as well. Therefore, the copying of the block path may only be a factor of a few times slower than modifying the lowest block by itself. This embodiment, like the others, can optionally benefit from the garbage reclamation described elsewhere.

Fourth Embodiment

The meta tree can be used as the primary direct-access memory means described in U.S. Pat. No. 5,283,894, which is included herein by reference. In this embodiment, the meta tree serves to provide fast access to the basic tree blocks in the secondary direct-access storage means that have copies in the primary direct-access memory means. The meta tree of that patent and the meta tree of this index system correspond to each other in this embodiment. The use or non-use of locks on the leaf blocks is not determined in this embodiment.

Fifth Embodiment

In the C and C plus plus and native assembly language and native machine code environments, there is normally no native garbage collector. In this embodiment, a block may contain for example a byte array to contain the keys and values or one byte array for keys and one byte array for values or other organizations of data in one or more memory regions. the The meta tree child block identifier is transformed when necessary into a pointer to a child meta tree block or to a leaf block by a variety of means, such as by casting the child block identifier to a pointer to a child block in memory or to a pointer to a child block header in memory, or by using it as an index into an array of pointers, or by using it as a key looked up in a hash table yielding a pointer, and so on. The ability of this index system to reclaim garbage blocks is particularly advantageous in this embodiment. The layered meta tree is compatible with this embodiment.

Sixth Embodiment

In the Java, C sharp and Visual Basic and other environments that avoid pointers but instead use references and which have their own native garbage collectors, this index system can provide a necessary additional type of garbage collection. The meta tree blocks do not contain references recognized by the native garbage collection mechanism, but instead contain data that needs to be translated into references to child blocks in some way. The translation mechanism can be implemented in a variety of ways, such as by using the child reference data as an index into an array containing a native block data array reference or as an index into an array containing a native block header reference which in turn contains a native reference to a block data array or else by using it in a hash table lookup to said data array or said block header and so on.

Absent the garbage collection of this index system, the native references in the array or hash table are never deleted but continue to exist, providing reachability to the blocks and preventing the native garbage collection from freeing them. This index system can garbage collect a block by adding it to an efficient free-block container of any kind or by setting a free bit in the block header and so on.

Seventh Embodiment

A meta tree can be stored on secondary storage rather than primary storage as in other embodiments. Thus at least one of the root block, the meta tree branch blocks, the lowest-level meta tree blocks, and the leaf blocks is present on secondary storage. This corresponds to the system in the referenced patents.

The invention claimed is:

1. A method for creating a layered tree for data storage and retrieval, comprising:
   providing a leaf layer comprising at least one leaf layer tree block, wherein access to each leaf layer tree block of the at least one leaf layer tree block is serialized by a locking means;
   providing a first meta tree comprising at least one meta tree block, wherein at least one of the at least one meta tree block contains at least one value, wherein each of the at least one value refers to one of the at least one leaf layer tree block;
   leaf inserting a first key into a first leaf layer tree block, wherein the insertion creates a second leaf layer tree block in addition to the first leaf layer tree block, wherein the first leaf layer block is modified in place by the inserting;
   inserting into the first meta tree a second key between the first leaf layer tree block and the second leaf layer tree block by creating at least one new second meta tree block determined by at least one source tree block of the first meta tree, to create a second meta tree, the second meta tree being a second version of the first meta tree;
   allocating at least one of the at least one new second meta tree block from a free block set;
   searching the first meta tree, wherein a searcher flushing selectively waits until each of at least one second search of the first meta tree is finished, dependent on a flushing being in progress;
   adding to the free block set at least one of the at least one source tree block dependent on a determination of whether there are searches in progress;
   determining the flushing being in progress dependent on at least the adding to the free block set;
   meta searching the first meta tree on a third search key to reach a modified leaf layer tree block;
   first modification leaf searching the modified leaf layer tree block on the third search key;
   second modification leaf searching the modified leaf layer tree block on the third search key;
   wherein the first and second modification leaf searching have different results, and
   wherein the first modification leaf searching happens before a modification of the modified leaf layer block and the second modification leaf searching happens after the modification according to a locking means.

2. The method of claim 1, wherein the flushing being in progress is further dependent on at least one selected from the group consisting of
   a free set monitor,
   a number of concurrent searchers,
   a system monitor,
   a process monitor,
   a kernel monitor,
   a device driver,
   or a combination thereof.

3. The method of claim 1, wherein the determination of whether there are searches in progress includes a read depth variable determined at the entry and exit of each search.

4. The method of claim 1, further including the steps of:
   meta searching the first meta tree on a third search key greater than the second key to reach a first leaf layer tree block;
   first leaf searching on the third search key in the first leaf layer tree block, wherein the third search key is determined to be less than a found key in the first leaf layer block; and
   second leaf searching on the third search key in the first leaf layer tree block, wherein the third search key is determined to be greater than each key in the first leaf layer tree block,
   wherein the first leaf searching happens before the leaf insertion and the leaf insertion happens before the second leaf searching according to the locking means.

5. The method of claim 1, further including the steps of:
   first meta searching the first meta tree on a third key to reach a third leaf layer tree block; and
   first determining whether the first meta searching reflects a most recent state of the layered tree dependent on whether the third key is greater than each key in the third leaf layer tree block.

6. The method of claim 5, further including the steps of:
   at least one retry searching on the third key on the second meta tree to reach a fourth leaf layer tree block, dependent on the first determining; and
   searching the fourth leaf layer tree block on the third key.

7. The method of claim 6, wherein the number of the at least one second searching is limited.

8. The method of claim 1, further including the steps of:
   first meta searching on a first modification key on the first meta tree to reach a first modified leaf layer tree block;
   second meta searching on a second modification key on the first meta tree to reach a second modified leaf layer tree block;
   modifying the first modified leaf layer tree block and the second modified leaf layer tree block concurrently while the first modified leaf layer tree block and the second leaf layer tree block are locked according to the locking means.

9. A layered tree system operating in a computer for data storage and retrieval comprising:
   a leaf layer comprising at least one leaf layer tree block, wherein access to each leaf layer tree block of the at least one leaf layer tree block is serialized by a locking means;
   a first meta tree comprising at least one meta tree block, wherein the at least one meta tree block contains at least one value, wherein each of the at least one value refers to one of the at least one leaf layer tree block;
   a first leaf layer tree block, wherein an insertion of a first key creates a second leaf layer tree block in addition to the first leaf layer tree block;
   a second meta tree, the second meta tree being a second version of the first meta tree, wherein inserting into the first meta tree a second key between the first leaf layer tree block and the second leaf layer tree block creates at least one new second meta tree block determined by at least one source tree block of the first meta tree;
   a modified leaf layer tree block reached by a first meta searching the first meta tree on a modification key;
   a first result of a first leaf searching on the modification key in the modified leaf layer tree block;
   a second result of a second leaf searching on the modification key in the modified leaf layer tree block,
   wherein the first result and second result are different, and
   wherein the first leaf searching on the modification key happens before a modification of the modified leaf layer tree block and the second leaf searching on the modification key happens after the modification according to the locking means.

10. The layered tree system of claim 9, further including garbage collection elements comprising:
  at least one freed block added to a free block set by a freeing, wherein the at least one freed block is at least one of the at least one source meta tree block;
  a search of the first meta tree, wherein a search flush delay selectively delays the search at least until each of at least one second search of the first meta tree is no longer in progress, dependent on a flushing being in progress;
  at least one allocated block removed from the free block set, wherein at least one of the at least one allocated block is at least one of the at least one new second tree block dependent on a determination of whether searches are in progress; and the flushing being in progress dependent on at least the freeing.

11. The layered tree system of claim 10, wherein the flushing being in progress is further dependent on at least one selected from the group consisting of
  a free set monitor,
  a number of concurrent searchers,
  a system monitor,
  a process monitor,
  a kernel monitor,
  a device driver,
  and a mixture thereof.

12. A method for creating a layered tree for data storage and retrieval, comprising:
  providing a leaf layer comprising at least one leaf layer tree block, wherein access to each leaf layer tree block of the at least one leaf layer tree block is serialized by a locking means;
  providing a first meta tree comprising at least one meta tree block, wherein at least one of the at least one meta tree block contains at least one value, wherein each of the at least one value refers to one of the at least one leaf layer tree block;
  leaf inserting a first key into a first leaf layer tree block, wherein the insertion creates a second leaf layer tree block in addition to the first leaf layer tree block;
  inserting into the first meta tree a second key between the first leaf layer tree block and the second leaf layer tree block by creating at least one new second meta tree block determined by at least one source tree block of the first meta tree, to create a second meta tree, the second meta tree being a second version of the first meta tree;
  first meta searching on a first modification key on the first meta tree to reach a first concurrently modified leaf layer tree block;
  second meta searching on a second modification key on the first meta tree to reach a second concurrently modified leaf layer tree block;
  modifying the first concurrently modified leaf layer tree block and the second concurrently modified leaf layer tree block concurrently; and
  third meta searching of the first meta tree on a third key to find a third leaf layer tree block, wherein
    first leaf searching the third leaf layer tree block on the third key, and
    second leaf searching the third leaf layer tree block on the third key
  have different results
  wherein the first leaf searching the third leaf layer tree block happens before a modification of the third leaf layer tree block and the second leaf searching the third leaf layer tree block happens after the modification according to the locking means.

13. The method of claim 12, further including steps for garbage collection comprising:
  allocating at least one of the at least one new second meta tree block from a free block set;
  searching the first meta tree, wherein a searcher flushing selectively waits until each of at least one second search of the first meta tree is finished, dependent on a flushing being in progress;
  adding to the free block set at least one of the at least one source tree block dependent on a determination that there are searches in progress; and
  determining the flushing being in progress dependent on at least the adding to the free block set.

14. The method of claim 12, further including the steps of:
  first split meta searching the first meta tree on a split key to reach a left leaf layer tree block;
  second split meta searching the second meta tree on the split key to reach a right leaf layer tree block,
  wherein the right leaf layer tree block is split from the left leaf layer tree block.

15. The system of claim 9, further including:
  a left leaf layer tree block reached by a first split meta searching the first meta tree on a split key; and
  a right leaf layer tree block reached by a second split meta searching the second meta tree on the split key,
  wherein the right leaf layer tree block is split from the left leaf layer tree block.

16. The method of claim 1, further including the steps of:
  first split meta searching the first meta tree on a split key to reach a left leaf layer tree block;
  second split meta searching the second meta tree on the split key to reach a right leaf layer tree block,
  wherein the right leaf layer tree block is split from the left leaf layer tree block.

17. The method of claim 1 further including the steps of:
  fourth searching the first meta tree according to a retried key to find a split leaf layer tree block;
  locking the split leaf layer tree block according to the locking means;
  determining whether the split leaf layer tree block was split while the fourth searching was waiting according to the locking means; and
  retry searching the second meta tree on the retried key to determine a retry leaf layer tree block dependent on the determining.

18. The method of claim 12 further including the steps of:
  fourth searching the first meta tree according to a retried key to find a split leaf layer tree block;
  locking the split leaf layer tree block according to the locking means;
  determining whether the split leaf layer tree block was split while the fourth searching was waiting according to the locking means; and
  retry searching the second meta tree on the retried key to determine a retry leaf layer tree block dependent on the determining.

19. The method of claim 12, wherein the method implements at least one selected from the group consisting of:
  a data access index in a database management system,
  a B-Tree index,
  a text index,
  a relational DBMS table,
  an object-oriented database,
  an Entity-Relation database,
  an Entity-Attribute database, an Entity-Attribute-Value database,
a geographic index,
a molecular index, and
a DNA index,
or a combination of the above.

* * * * *